(12) United States Patent
Nishikawa et al.

(10) Patent No.: US 10,179,368 B2
(45) Date of Patent: Jan. 15, 2019

(54) WIRE ELECTRIC DISCHARGE MACHINE HAVING ESTIMATION FUNCTION FOR FILTER REPLACEMENT TIMING

(71) Applicant: FANUC Corporation, Yamanashi (JP)

(72) Inventors: Ryou Nishikawa, Yamanashi (JP); Shouji Takahashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 379 days.

(21) Appl. No.: 14/874,727

(22) Filed: Oct. 5, 2015

(65) Prior Publication Data

US 2016/0096231 A1 Apr. 7, 2016

(30) Foreign Application Priority Data

Oct. 6, 2014 (JP) .................. 2014-205907

(51) Int. Cl.
| | |
|---|---|
| *B23H 1/10* | (2006.01) |
| *B01D 37/04* | (2006.01) |
| *B01D 35/143* | (2006.01) |
| *B23H 1/00* | (2006.01) |
| *B01D 35/02* | (2006.01) |
| *B23H 3/10* | (2006.01) |

(Continued)

(52) U.S. Cl.
CPC ............. *B23H 1/10* (2013.01); *B01D 35/02* (2013.01); *B01D 35/143* (2013.01); *B01D 37/046* (2013.01); *B23H 1/00* (2013.01); *B23H 3/10* (2013.01); *C02F 1/008* (2013.01); *B23H 7/20* (2013.01); *C02F 2209/03* (2013.01); *C02F 2209/40* (2013.01); *C02F 2209/445* (2013.01)

(58) Field of Classification Search
CPC .... B01D 35/02; B01D 35/143; B01D 37/046; B01D 37/04; C02F 2209/445; B23H 1/10; B23H 1/00
USPC ........................................................ 210/97
See application file for complete search history.

(56) References Cited

U.S. PATENT DOCUMENTS

| | | |
|---|---|---|
| 5,045,663 A | 9/1991 | Neal et al. |
| 5,081,332 A | 1/1992 | Sakuragawa |

(Continued)

FOREIGN PATENT DOCUMENTS

| | | |
|---|---|---|
| CN | 1055683 A | 10/1991 |
| CN | 1334161 A | 2/2002 |

(Continued)

OTHER PUBLICATIONS

Decision to Grant a Patent in JP Application No. 2014-205907, dated Feb. 14, 2017.

(Continued)

*Primary Examiner* — Heidi R Kelley
*Assistant Examiner* — Akash K Varma
(74) *Attorney, Agent, or Firm* — Hauptman Ham, LLP

(57) ABSTRACT

A wire electric discharge machine has a function of estimating the time for replacement of a filter based on a use situation for the machine. A time Tr during which the filter is serviceable is calculated according to an equation, $Tr=|(Pd-Pn)/\Delta P|$, based on a fluid pressure variation amount $\Delta P$, a current filter fluid pressure $Pn$, and a filter life pressure. A remaining available time Td for the filter which takes into account the operation rate of the machine is calculated according to an equation, $Td=Tr/W$.

8 Claims, 6 Drawing Sheets

(51) Int. Cl.
*C02F 1/00* (2006.01)
*B23H 7/20* (2006.01)

(56) References Cited

U.S. PATENT DOCUMENTS

| | | | | |
|---|---|---|---|---|
| 5,386,094 | A * | 1/1995 | Kawai | B23H 1/10 219/69.14 |
| 2002/0134759 | A1 * | 9/2002 | Kita | B23H 1/10 219/69.14 |
| 2004/0238417 | A1 | 12/2004 | Arakawa et al. | |
| 2005/0267624 | A1 | 12/2005 | Kita et al. | |
| 2007/0175814 | A1 | 8/2007 | Kita et al. | |
| 2012/0228201 | A1 | 9/2012 | Kasai et al. | |
| 2013/0161242 | A1 * | 6/2013 | Kasai | B23H 1/10 210/85 |

FOREIGN PATENT DOCUMENTS

| | | |
|---|---|---|
| CN | 102672294 A | 9/2012 |
| EP | 1486281 A1 | 12/2004 |
| JP | S59-115124 A | 7/1984 |
| JP | H02-95407 A | 4/1990 |
| JP | H02-131821 A | 5/1990 |
| JP | 6-222825 A | 8/1994 |
| JP | 2002-283146 A | 10/2002 |
| JP | 2004-358573 A | 12/2004 |
| JP | 2005-334989 A | 12/2005 |
| JP | 2007-203408 A | 8/2007 |
| JP | 2009-56446 A | 3/2009 |
| JP | 2009-156174 A | 7/2009 |
| JP | 2010-162631 A | 7/2010 |
| JP | 2010-227899 A | 10/2010 |
| JP | 2010-255875 A | 11/2010 |
| JP | 2013-129022 A | 7/2013 |

OTHER PUBLICATIONS

Extended European Search Report in EP Application No. 15183636.8, dated Mar. 23, 2016.
Office Action in CN Application No. 201510641941.8, dated Dec. 1, 2017, 14 pp.

* cited by examiner

FLUID PRESSURE GAUGE IS INSTALLED BEHIND FILTER

FLUID PRESSURE GAUGE IS INSTALLED BEFORE FILTER

FIG.3

| NUMBER<br>MACHINING SITUATION | DATA 1 | DATA 2 | DATA 3 | .... | DATA n |
|---|---|---|---|---|---|
| MACHINING CONDITION | A1 | A2 | A3 | .... | An |
| MACHINING MATERIAL | B1 | B2 | B3 | .... | Bn |
| MACHINING THICKNESS | C1 | C2 | C3 | .... | Cn |
| WIRE DIAMETER | D1 | D2 | D3 | .... | Dn |
| WIRE MATERIAL | E1 | E2 | E3 | .... | En |
| MACHINING FLUID QUALITY | F1 | F2 | F3 | .... | Fn |
| FLUID PRESSURE VARIATION AMOUNT ΔP | α1 | α2 | α3 | .... | αn |

| MACHINING CONDITION | A1 | A2 | A3 | .... | An |
|---|---|---|---|---|---|
| COEFFICIENT | $\varepsilon 1$ | $\varepsilon 2$ | $\varepsilon 3$ | | $\varepsilon n$ |

(b)

| MACHINING MATERIAL | B1 | B2 | B3 | .... | Bn |
|---|---|---|---|---|---|
| COEFFICIENT | $\zeta 1$ | $\zeta 2$ | $\zeta 3$ | | $\zeta n$ |

(c)

| MACHINING THICKNESS | C1 | C2 | C3 | .... | Cn |
|---|---|---|---|---|---|
| COEFFICIENT | $\eta 1$ | $\eta 2$ | $\eta 3$ | | $\eta n$ |

FIG.5

| NUMBER<br>MACHINING SITUATION | DATA 1 | DATA 1A | DATA 1B |
|---|---|---|---|
| MACHINING CONDITION | A1 | A2(CHANGED FROM A1 TO A2) | A2 |
| MACHINING MATERIAL | B1 | B1 | B2(CHANGED FROM B1 TO B2) |
| MACHINING THICKNESS | C1 | C1 | C1 |
| WIRE DIAMETER | D1 | D1 | D1 |
| WIRE MATERIAL | E1 | E1 | E1 |
| MACHINING FLUID QUALITY | F1 | F1 | F1 |
| FLUID PRESSURE VARIATION AMOUNT ΔP | $\alpha 1$ | $\alpha 1 \times \varepsilon 2 / \varepsilon 1$ | $A1 \times (\varepsilon 2 / \varepsilon 1)$ $\times (\zeta 2 / \zeta 1)$ |

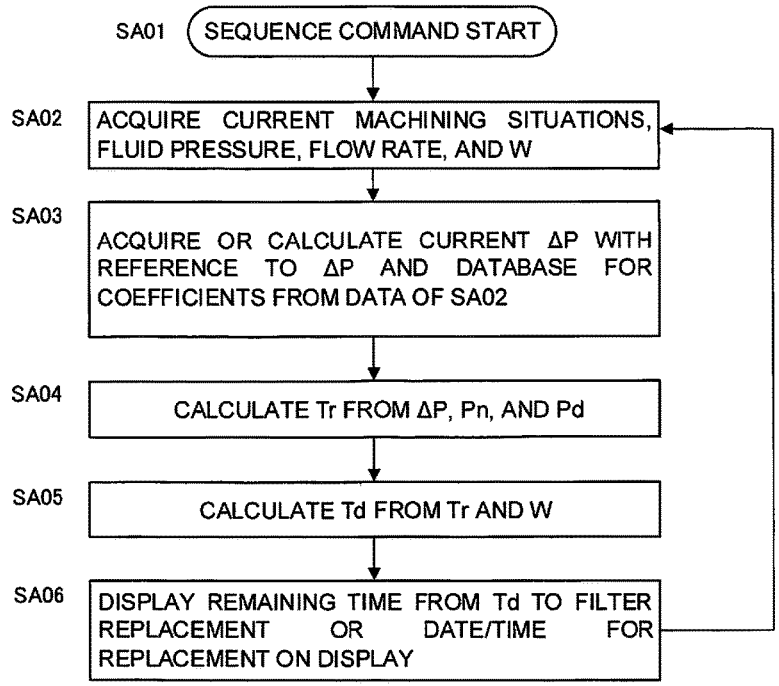

WIRE ELECTRIC DISCHARGE MACHINE HAVING ESTIMATION FUNCTION FOR FILTER REPLACEMENT TIMING

RELATED APPLICATIONS

The present application claims priority to Japanese Application Number 2014-205907, filed Oct. 6, 2014, the disclosure of which is hereby incorporated by reference herein in its entirety.

BACKGROUND OF THE INVENTION

Field of the Invention

The present invention relates to a wire electric discharge machine, and more particularly, to a wire electric discharge machine having a function of estimating the time for replacement of a filter.

Description of the Related Art

In an electric discharge machine such as a wire electric discharge machine, a machining fluid is circulated during use. Therefore, machining chips produced by electric discharge machining and contained in a machining fluid are filtered by a filter. Since the filter is a consumption article, it must be changed when its filtration capacity is reduced.

Conventionally, when the time during which machining fluid passes through the filter reaches a specific value so that an output from a gauge, such as a fluid pressure or water gauge previously attached to a pipe in the filter or a pipe before or behind the filter, reaches a certain threshold, a caution or warning is displayed on the screen of a controller for the machine to encourage replacement of the filter.

Further, there is a known technique in which the time for the reduction of the filtration capacity is estimated in advance as a criterion for perception of the time for filter replacement. Japanese Patent Application Laid-Open No. 2-95407 discloses a technique in which the remaining available time of a filter is estimated and output based on past fluid pressures and time history. Thus, the technique disclosed in this patent document requires the past history. If machining conditions are changed as in the case of electric discharge machining, therefore, the load on the filter greatly changes, so that the estimation accuracy is considerably reduced despite analogy based on the past history.

Japanese Patent Applications Laid-Open Nos. 59-115124 and 2-131821 disclose techniques in which an alarm is displayed when or before the lifetime or service frequency limit of wire consumption articles is reached. Japanese Patent Application Laid-Open No. 2005-334989 discloses a technique in which the consumption rate of a cutting tool of a wire cutting device is calculated and the remaining life of the cutting tool is determined based on the calculated consumption rate. Further, Japanese Patent Application Laid-Open No. 2010-162631 discloses a technique in which a faulty connection parts created by automatic wire connection are recorded and frequently failed parts are encouraged to undergo maintenance.

As described above, there is a known technique in which a caution or warning for the time of filter replacement is issued. Since the use situation for the machine varies for each user, the filter replacement timing cannot be accurately estimated. Thus, since the replacement cycle of the filter considerably varies depending on the operating time and machining contents, the number of days required before the next replacement cannot be estimated in the case of a particularly long replacement cycle. Consequently, it is difficult to plan for efficient filter replacement.

Since the filter replacement timing is unclear, moreover, it may sometimes be necessary to keep a somewhat larger stock of filters than usual in advance. In order to avoid generation of an alarm as much as possible, moreover, a filter may be changed a little earlier than expected despite its remaining available time. Consequently, the number of filters to be used may increase, so that the burden on a user also increases. In some cases, moreover, the delivery date may be missed if the filter is purchased after a caution is displayed. In case of a warning, the filter may not be able to be changed, possibly causing a machine downtime.

In many cases of wire electric discharge machining, the machining time for each stage is very long. If the replacement cycle is short, therefore, a warning for filter replacement may possibly be issued during machining. Filter replacement during electric discharge machining is a troublesome operation that takes time and labor. If the electric discharge machining is continued without filter replacement, the filtered machining fluid supplied to a machining tank lacks in volume due to the reduced filtration capacity of the filter. Thereupon, wire breakage or machining accuracy failure may be caused, finally resulting in issuance of an alarm notifying of lowering of the machining fluid level and interruption of the machining.

SUMMARY OF THE INVENTION

Accordingly, the object of the present invention is to provide a wire electric discharge machine having an estimation function for filter replacement timing capable of estimating the time for filter replacement based on a use situation for the machine.

A wire electric discharge machine according to the present invention is configured to perform electric discharge machining while jetting a machining fluid and provided with a filtration device which filters, by means of a filter, machining chips discharged by the electric discharge machining. The wire electric discharge machine comprises a fluid pressure detection unit disposed in a filter pipe through which the machining fluid is supplied to the filter and configured to detect a fluid pressure, a database stored with a fluid pressure variation amount of the filter per unit time corresponding to machining conditions, machining material, machining thickness, wire diameter, wire material, and machining fluid quality, a fluid pressure variation amount acquisition unit configured to acquire a current fluid pressure variation amount per unit time from the database, based on a current machining condition, machining material, machining thickness, wire diameter, wire material, and machining fluid quality, a remaining available time calculation unit configured to calculate a remaining time during which the filter is serviceable, based on the acquired fluid pressure variation amount per unit time, the current fluid pressure detected by the fluid pressure detection unit, and an upper limit value of the fluid pressure at which the filter is serviceable, a remaining day/hour calculation unit configured to calculate the number of remaining days and hours before the life of the filter is expired, based on the operation rate of the wire electric discharge machine, the remaining available time, and a current date/time, and a display unit configured to display the calculated number of remaining days and hours.

The database may include coefficients for the fluid pressure variation amount per unit time for each combination of the machining conditions, machining material, machining thickness, wire diameter, wire material, and machining fluid quality, and the wire electric discharge machine may further comprise a fluid pressure variation amount calculation unit configured, when any of the data including the machining conditions, machining material, machining thickness, wire diameter, wire material, and machining fluid quality is changed, to calculate the fluid pressure variation amount of the changed data per unit time, based on the ratio between coefficients for fluid pressure variation per unit time before and after the change and the fluid pressure variation amount before the change.

The fluid pressure variation amount of the filter per unit time may be changed based on the current fluid pressure.

The fluid pressure variation amount of the filter per unit time may be changed based on the flow rate of the machining fluid which passes through the filter.

According to the present invention, there can be provided a wire electric discharge machine having an estimation function for filter replacement timing capable of estimating the time for filter replacement based on a use situation for the machine.

BRIEF DESCRIPTION OF THE DRAWINGS

The above and other objects and features of the present invention will be apparent from the ensuing description of embodiments with reference to the accompanying drawings, in which:

FIG. 3 is a diagram showing an example of a database for a fluid pressure variation amount per unit time;

FIG. 4 is a diagram showing examples of coefficients for machining situations (machining conditions, machining material, machining thickness, etc.) of the fluid pressure variation amount per unit time;

FIG. 5 is a diagram showing an example of calculation of the fluid pressure variation amount per unit time based on coefficients;

FIG. 6A is a diagram showing examples of coefficients for filter fluid pressures (fluid pressure values) for the fluid pressure variation amount per unit time;

FIG. 6B is a diagram showing examples of coefficients for flow rates of a fluid supplied to the filter for the fluid pressure variation amount per unit time; and FIG. 7 is a flowchart showing processing performed by a controller shown in FIG. 1.

DETAILED DESCRIPTION OF THE PREFERRED EMBODIMENTS

Figure 1:
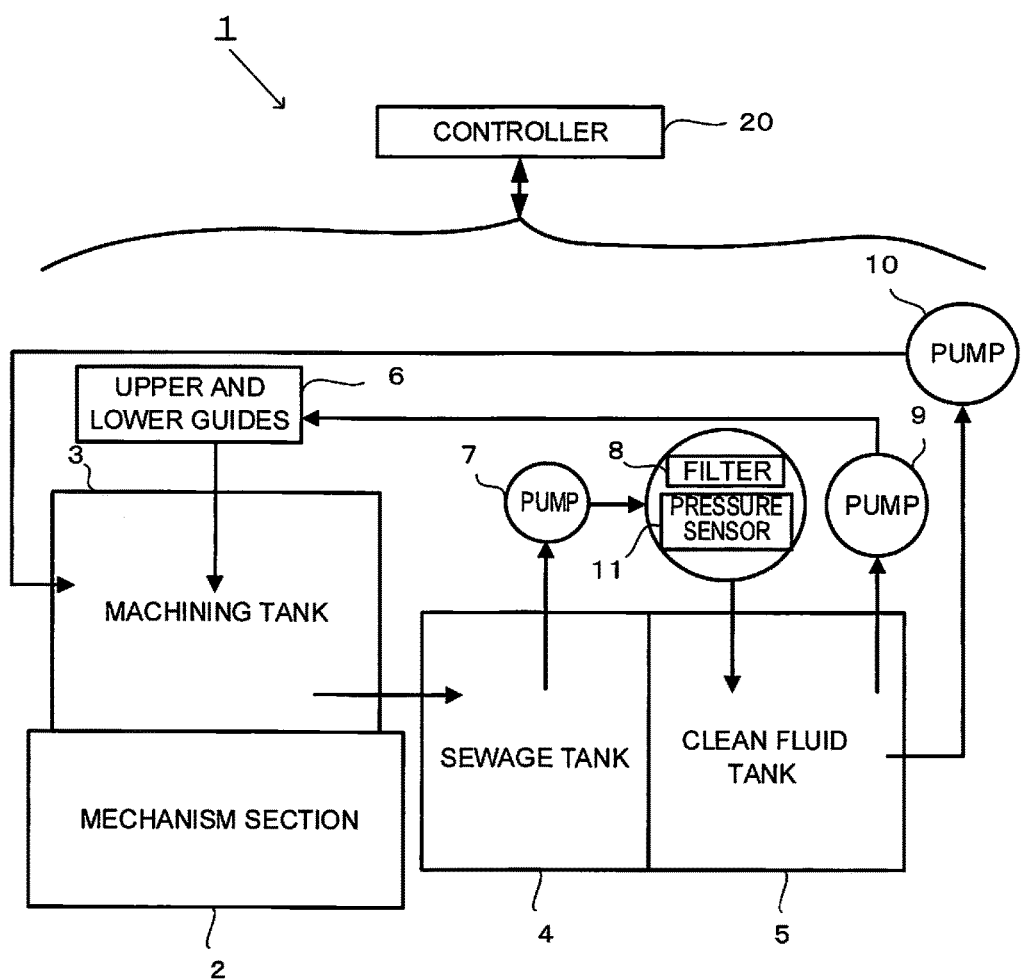
FIG. 1 is a diagram showing one embodiment of a wire electric discharge machine according to the present invention.

A filter for machining fluid purification used in a wire electric discharge machine is subject to fluid pressure variations. A fluid pressure variation amount of the filter per unit time is generally fixed according to machining conditions, machining material, machining thickness, wire diameter, wire material, machining fluid quality, and the like. This is because the amount of machining chips produced by electric discharge machining per unit time depends on physical quantities such as the machining conditions, machining material, machining thickness, wire diameter, wire material, and machining fluid quality. The pressure variation in the filter will be described later.

Thus, according to the present invention, the wire electric discharge machine is provided with a database for the fluid pressure variation amount of the filter per unit time. The time (remaining available time) during which the filter is serviceable is calculated based on data for the current fluid pressure in the filter measured by a fluid pressure gauge, fluid pressure data for the serviceable filter, and data in the database. The date/time of filter replacement is estimated and displayed based on the remaining available time and the operation rate of the machine.

Thus, according to the present invention, the time for filter replacement adjusted to a use situation for each user can be estimated and displayed, so that planning for filter replacement and inventory control of filters are facilitated. Further, the filter replacement cannot be neglected, so that wire breakage, machining accuracy failure, machine stop (machine down), and the like can be prevented.

One embodiment of the wire electric discharge machine according to the present invention will be described with reference to FIG. 1.

The wire electric discharge machine 1 comprises a machining tank 3, sewage tank 4, and clean fluid tank 5. The machining tank 3 is disposed on a mechanism section 2. The entire wire electric discharge machine 1 is controlled by a controller 20. The controller 20 comprises an arithmetic device, a storage device stored with various data, and a display device for various displays.

A workpiece (not shown) is electrical-discharge-machined in the machining tank 3 by the wire electric discharge machine 1. During the electric discharge machining, a machining fluid drawn up from the clean fluid tank 5 by a pump 9 is jetted from an upper guide (or upper and lower guides) in the machining tank 3. Machining chips are produced by the electric discharge machining and suspended in the machining fluid in the machining tank 3. The machining fluid containing the machining chips in the machining tank 3 is discharged into the sewage tank 4.

The machining fluid containing the machining chips discharged from the machining tank 3 and pooled in the sewage tank 4 is drawn up from the sewage tank 4 by a pump 7 and delivered to a filter 8 on the downstream side of the pump 7. Thereupon, the machining chips in the machining fluid are filtered by the filter 8. The machining fluid filtered and purified by the filter 8 is supplied to the clean fluid tank 5.

A pressure sensor 11 for detecting the pressure of the machining fluid is disposed in a pipe before or behind the filter 8 or in the filter 8. The pressure detected by the pressure sensor 11 is referred to as "current fluid pressure in the filter". As the machining chips are trapped by the filter, the fluid pressure detected by the pressure sensor 11 varies. This variation of the fluid pressure is referred to as "fluid pressure variation in the filter".

The machining fluid in the clean fluid tank 5 is drawn up by the pump 9 and ejected as machining fluid jets from upper and lower guides 6. Further, the machining fluid is drawn up from the clean fluid tank 5 by a pump 10, and the drawn-up fluid is used for circulation into and reserve in the machining tank 3. Further, a filter (not shown) for filtering machining chips may be installed in a pipe through which the machining fluid is passed by the pump 9 or 10 or a pipe through which the machining fluid is passed from the machining tank 3 to the sewage tank 4.

Figure 2A:
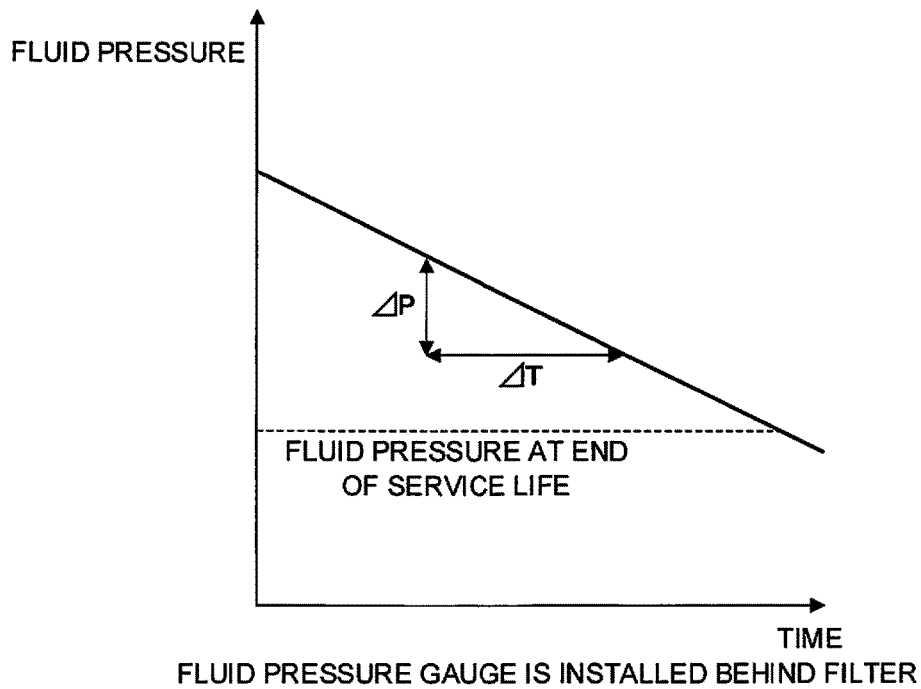
FIG. 2A is a diagram illustrating how it is determined that the life of a filter is expired when a fluid pressure value measured by a fluid pressure gauge installed on the downstream side of the filter finally falls below a specific value after gradually decreasing with the passage of time during which the filter is used.
Figure 2B:
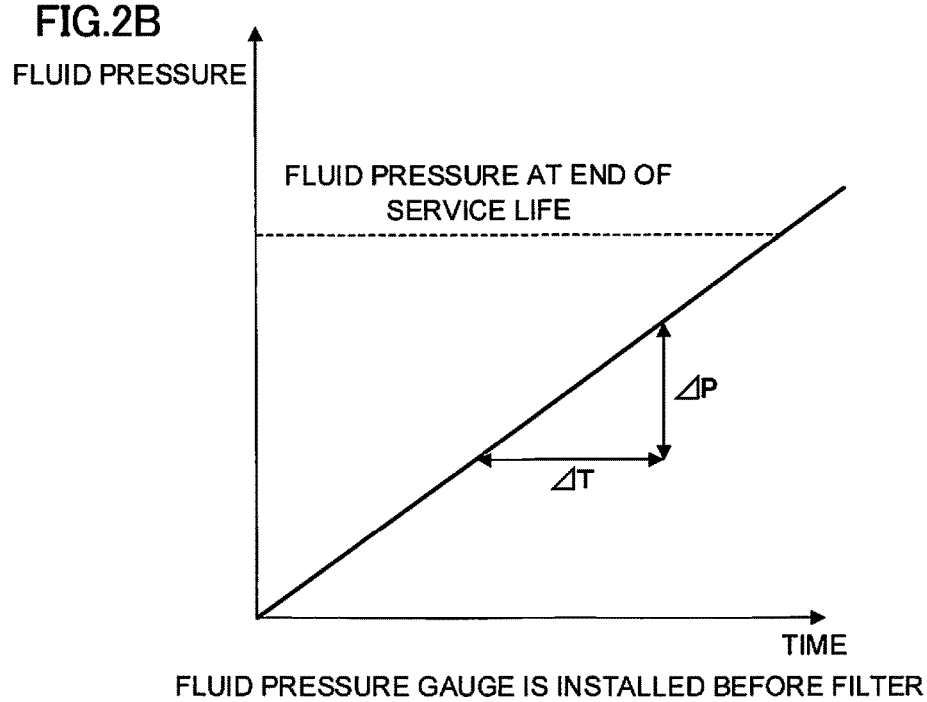
FIG. 2B is a diagram illustrating how it is determined that the life of the filter is expired when a fluid pressure value measured by the fluid pressure gauge installed on the upstream side of the filter finally exceeds a specific value after gradually increasing with the passage of time during which the filter is used.

In general, the period during which a filter is serviceable, that is, the service life of the filter, can be determined by using a fluid pressure gauge installed on the downstream or upstream side of the filter. If the fluid pressure gauge is installed on the downstream side of the filter, a fluid pressure value measured by the fluid pressure gauge gradually decreases with the passage of the time during which the filter is used. When the measured fluid pressure finally falls below a specific value, it can be determined that the life of the filter is expired (see FIG. 2A). If the fluid pressure gauge is installed on the upstream side of the filter, in contrast, the fluid pressure value measured by the fluid pressure gauge gradually increases with the passage of the time during which the filter is used. When a specific value is finally exceeded by the measured fluid pressure value, it can be determined that the life of the filter is expired (see FIG. 2B).

As mentioned before, a fluid pressure variation amount $\Delta P$ per unit time $\Delta T$ of the filter in operation is generally fixed according to the machining conditions, machining material, machining thickness, wire diameter, wire material, machining fluid quality, and the like. The machining conditions include an electric discharge condition, a jet condition, and the number of machining cycles. The machining fluid quality implies the kind, components, electrical conductivity, and temperature of the machining fluid. In the description of the invention to follow, the machining conditions, machining material, machining thickness, wire diameter, wire material, machining fluid quality, and the like will be referred to as the machining situations.

According to the present invention, the fluid pressure variation amount $\Delta P$ per unit time $\Delta T$ is first acquired by experiment or the like in each machining situation. FIG. 3 shows the database for the fluid pressure variation amount LP per unit time $\Delta T$ acquired by experiment or the like in each machining situation. In FIG. 3, A1 to An, B1 to Bn, C1 to Cn, D1 to Dn, E1 to En, and F1 to Fn represent data 1 to n in the machining situations, respectively.

The database shown in FIG. 3 is stored into a memory (not shown) of the controller 20 (FIG. 1) for the wire electric discharge machine 1. If the fluid pressure variation amount $\Delta P$ per unit time $\Delta T$ is stored as the database in the memory of the controller 20 for each machining situation, as shown in FIG. 3, then the necessary memory capacity for the storage becomes very large.

For the fluid pressure variation amount $\Delta P$, the data (see data 1 to n of FIG. 3) of the machining situations, including the machining conditions, machining material, machining thickness, etc., are substantially proportional to one another. If data for the fluid pressure variation amount of the filter are acquired by experiment or the like, coefficients of the fluid pressure variation amount such as those shown in FIG. 4 can be obtained. FIG. 4 shows examples of coefficients for the machining situations (machining conditions, machining material, machining thickness, etc.) for the fluid pressure variation amount.

By way of example, the fluid pressure variation amount $\Delta P$ of data 1A obtained when the machining condition, as one data in the machining situations for the data 1, is changed from A1 to A2, as shown in FIG. 5, is $\alpha 1 \times (\varepsilon 2/\varepsilon 1)$, based on the data of FIGS. 3 and 4. Further, the fluid pressure variation amount $\Delta P$ of data 1B obtained when the machining material is changed from B1 to B2 is $\alpha 1 \times (\varepsilon 2/\varepsilon 1) \times (\zeta 2/\zeta 1)$. Thus, the coefficients for the machining situations are compiled into the database so that the fluid pressure variation amount $\Delta P$ can be calculated in the manner described above (by multiplication and division of the coefficients). Consequently, all combinations of the data for the machining situations need not be stored, so that the database can be scaled down.

Since clogging progresses so that the filtration capacity of the filter is reduced with the passage of the time during which the filter is used, the fluid pressure variation amount LP changes also depending on the fluid pressure (fluid pressure value) in the filter. The fluid pressure variation amount $\Delta P$ and the fluid pressure value detected by the sensor are also proportional to each other, thus having a correlation impervious to the machining situations.

Thereupon, in order to obtain an accurate fluid pressure variation value, a coefficient $\lambda n$ is measured and compiled into a database for each fluid pressure (see FIG. 6A), as in the case of the coefficients for the machining situations. The fluid pressure variation amount $\Delta P$ of the filter per unit time (which is accurate, taking into account the fluid pressure in the filter, too) can be obtained by multiplying a fluid pressure variation amount $\alpha n$ on the database corresponding to the current machining situations by the coefficient $\lambda n$ corresponding to a filter fluid pressure value Gn obtained from a detector currently monitoring the filter.

In general, moreover, a machining fluid is supplied to a filter at a fixed flow rate. As the flow rate of the machining fluid supplied to the filter changes, however, the amount of machining chips delivered to the filter per unit time also changes. Therefore, the fluid pressure variation amount $\Delta P$ changes depending not only on the machining fluid pressure but also on the flow rate. Since the fluid pressure variation amount $\Delta P$ and the flow rate are also proportional to each other, a coefficient $vn$ is measured and compiled into a database for each flow rate (see FIG. 6B), as in the case of the fluid pressure (see FIG. 6A).

In case where the machining fluid is not supplied to the filter at the fixed flow rate, a filter pipe of the wire electric discharge machine 1 shown in FIG. 1 is provided with a flow rate measurement unit for measuring the flow rate of the machining fluid supplied thereto. Thus, the fluid pressure variation amount $\Delta P$ of the filter per unit time (which is accurate, also based on the consideration of the flow rate variation of the filter) can be obtained by multiplying the fluid pressure variation amount $\alpha n$ on the database corresponding to the current machining situations by the coefficient $vn$ corresponding to a current flow rate Hn, which is the measurement value of the flow rate measurement unit.

Since the coefficients for the fluid pressure and the flow rate can be considered to increase substantially linearly, coefficients for fluid pressure and flow rate, which have not been measured, can be calculated by interpolation based on successive fluid pressures, flow rates, and coefficients.

Since the coefficients for the fluid pressure variation amount $\Delta P$ based on modifications of the machining situations, fluid pressure change, and flow rate change, or a combination thereof, are independent of one another, the fluid pressure variation amount $\Delta P$ can also be calculated in combination according to the modifications and changes. In doing this, all or some of the coefficients for the modifications of the machining situations, fluid pressure change, and flow rate change may be used.

A time Tr during which the filter is serviceable can be calculated according to equation (1), based on the fluid pressure variation amount $\Delta P$, a current filter fluid pressure Pn, and a filter life pressure (value of the pressure sensor 11 which is output when the filtration capacity of the filter has reached its limit) Pd, as follows:

$$Tr=|(Pd-Pn)/\Delta P|. \quad (1)$$

Since the time Tr during which the filter is serviceable is a time for continuous use, it cannot easily be used for the estimation of actual filter replacement. Therefore, more accurate estimation can be achieved by using an operation rate of a machine (operating time of the machine per unit time) W for a "predetermined period". The "predetermined period" used herein is a period specified by a user or a cumulative use period from the start of use of the machine to the present time. A remaining available time Td for the filter based on the consideration of the operation rate of the machine, which indicates how much longer the filter can be used from now, can be given by $$Td=Tr/W. \quad (2)$$

Based on the calculated available time Td which takes into account the operation rate of the machine, the remaining available time for the filter is displayed on a display (not shown) of the controller 20 on the wire electric discharge machine 1. In general, the replacement cycle of a filter is so long that the remaining available time can be better understood if it is displayed in the form of the number of remaining days and hours or the date of replacement. The calculation and display are performed periodically or when the machining situations, fluid pressure, and flow rate are changed so that they correspond to the changes of the machining situations, fluid pressure, and flow rate.

FIG. 7 is a flowchart showing processing performed by the controller for controlling the wire electric discharge machine according to the present invention. The following is a sequential description of various steps of operation.

[Step SA01] An estimation sequence is started.

[Step SA02] The current machining situations, current filter fluid pressure, flow rate, and operation rate W of the machine are acquired.

[Step SA03] The current fluid pressure variation amount ΔP is acquired or calculated with reference to the fluid pressure variation amount LP per unit time ΔT and the database for the coefficients based on the data acquired in Step SA02.

[Step SA04] The time Tr during which the filter is serviceable is calculated according to equation (1), based on the current fluid pressure variation amount ΔP, current filter fluid pressure Pn, and filter life pressure Pd.

[Step SA05] The remaining available time Td for the filter which takes into account the operation rate of the machine is calculated according to equation (1), based on the time Tr during which the filter is serviceable and the operation rate W.

[Step SA06] The remaining time to the filter replacement or the date/time of the replacement is displayed on the display based on the remaining available time Td for the filter which takes into account the operation rate of the machine. Thereafter, the processing returns to Step SA02 periodically or when the machining situations, current filter fluid pressure, and current flow rate of the pipe provided with the filter are changed, whereupon the processing is repeated.

"The current flow rate of the filter is acquired" in Step SA02 of the flowchart of FIG. 7 may be replaced with "the current flow rate of the pipe provided with the filter is acquired". Further, "the current fluid pressure variation amount ΔP is acquired" in Step SA03 includes, for example, direct use of the values in the database of FIG. 3 or acquisition of the fluid pressure variation amount shown in FIG. 5 by calculation.

According to the embodiment of the present invention, all of the database storage device, arithmetic devices, and display device are assumed to be included in the controller of the wire electric discharge machine. However, data such as the current filter fluid pressure and flow rate, the machining situations, and the like, which are monitored (or detected) by the controller for the wire electric discharge machine, may be sent from the wire electric discharge machine to an external arithmetic display device, such as a personal computer. In this case, such an external arithmetic display device has a storage area for the database for the fluid pressure variation amount ΔP and calculates or displays the fluid pressure variation amount ΔP and life estimation.

The invention claimed is:

1. A wire electric discharge machine configured to perform electric discharge machining while jetting a machining fluid, the wire electric discharge machine comprising:
    a filtration device having a filter configured to filter machining chips discharged by the electric discharge machining;
    a fluid pressure detection unit disposed in a filter pipe through which the machining fluid is supplied to the filter, and configured to detect a fluid pressure of the machining fluid;
    a database storing fluid pressure variation amounts of the filter per unit time together with correlated machining conditions, machining material, machining thickness, wire diameter, wire material, and machining fluid quality;
    a fluid pressure variation amount acquisition unit configured to acquire a current fluid pressure variation amount per unit time from the database, based on a current machining condition, machining material, machining thickness, wire diameter, wire material, and machining fluid quality;
    a remaining available time calculation unit configured to calculate a remaining available time during which the filter is serviceable, based on the acquired current fluid pressure variation amount per unit time acquired from the database, the current fluid pressure detected by the fluid pressure detection unit, and an upper limit value of the fluid pressure at which the filter is serviceable;
    a remaining day/hour calculation unit configured to calculate the number of remaining days and hours before the life of the filter is expired, based on the operation rate of the wire electric discharge machine, the remaining available time acquired by the remaining available time calculation unit, and a current date/time; and
    a display unit configured to display the calculated number of remaining days and hours.

2. The wire electric discharge machine according to claim 1, wherein
    the database includes coefficients for the fluid pressure variation amount per unit time for each combination of the machining conditions, machining material, machining thickness, wire diameter, wire material, and machining fluid quality, and
    the wire electric discharge machine further comprises a fluid pressure variation amount calculation unit configured, in response to a change of any of the data including the machining conditions, machining material, machining thickness, wire diameter, wire material, and machining fluid quality, to calculate the fluid pressure variation amount of the changed data per unit time, based on a ratio between the coefficients for the fluid pressure variation amount per unit time before and after the change and the fluid pressure variation amount per unit time before the change.

3. The wire electric discharge machine according to claim 1, wherein the fluid pressure variation amount of the filter per unit time is changed based on the current fluid pressure.

4. The wire electric discharge machine according to claim 1, wherein the fluid pressure variation amount of the filter per unit time is changed based on a flow rate of the machining fluid which passes through the filter.

5. The wire electric discharge machine according to claim 1, wherein the machining conditions include at least one of an electric discharge condition, a jet condition, and a number of machining cycles.

6. The wire electric discharge machine according to claim 1, wherein the fluid pressure variation amount per unit time, obtained when the machining condition is changed from A1 to A2, is $$\alpha 1 \times (\varepsilon 2/\varepsilon 1),$$

where A1 is a first machining condition;
A2 is a second machining condition;
$\varepsilon 1$ is a first coefficient for the first machining condition A1;
$\varepsilon 2$ is a second coefficient for the second machining condition A2; and
$\alpha 1$ is a fluid pressure variation amount per unit time for the first machining condition A1.

7. The wire electric discharge machine according to claim 1, wherein the remaining available time Tr during which the filter is serviceable is calculated according to an equation, $$Tr = |(Pd - Pn)/\Delta P|,$$

where
$\Delta P$ is the current fluid pressure variation amount per unit time,
Pn is the current fluid pressure, and
Pd is the upper limit value of the fluid pressure at which the filter is serviceable.

8. The wire electric discharge machine according to claim 1, wherein
the calculations and the display are performed periodically or when machining situations, fluid pressure, and flow rate are changed so that the calculations and the display correspond to changes of the machining situations, fluid pressure, and flow rate.

* * * * *